US005903089A

United States Patent [19]

Donofrio et al.

[11] Patent Number: 5,903,089

[45] Date of Patent: May 11, 1999

[54] MONOCHROME CRT HAVING CURVED DISPLAY WINDOW WITH REDUCED TRANSMISSION AND PROJECTION COLOR TV INCORPORATING SAME

[75] Inventors: Robert L. Donofrio, Saline, Mich.; André A. van der Voort, Son en Breugel, Netherlands

[73] Assignee: Philips Electronics North America Corporation, New York, N.Y.

[21] Appl. No.: 08/026,246

[22] Filed: Mar. 4, 1993

Related U.S. Application Data

[63] Continuation of application No. 07/459,915, Jan. 2, 1990, abandoned.

[51] Int. Cl.[6] .......... H01S 29/20

[52] U.S. Cl. .......... 313/112

[58] Field of Search .......... 313/474, 480, 313/112

[56] References Cited

U.S. PATENT DOCUMENTS

| | | | |
|---|---|---|---|
| 4,132,919 | 1/1979 | Maple | 313/112 X |
| 4,376,829 | 3/1983 | Daiku | 313/480 X |
| 4,405,881 | 9/1983 | Kobayashi | 313/480 |
| 4,521,524 | 6/1985 | Yamashita | 313/480 X |
| 4,755,868 | 7/1988 | Hodges | 313/474 X |
| 4,769,347 | 9/1988 | Cook et al. | 313/480 X |

*Primary Examiner*—Sandra O'Shea
*Attorney, Agent, or Firm*—John C. Fox

[57] ABSTRACT

The bulls-eye effect produced in the projected image by projection television cathode ray display tubes with convexly curved faceplates and multi-layer interference filters is compensated by using darkened or tinted glass. Since the faceplate glass is thicker in the center, more attenuation of the light output occurs there than at the edges of the display window where the glass is thinner, resulting in improved luminance uniformity of the display.

8 Claims, 2 Drawing Sheets

MONOCHROME CRT HAVING CURVED DISPLAY WINDOW WITH REDUCED TRANSMISSION AND PROJECTION COLOR TV INCORPORATING SAME

This is a continuation of application Ser. No. 07/459,915, filed Jan. 2, 1990 now abandoned.

CROSS REFERENCE TO RELATED APPLICATIONS

Copending U.S. patent applications Ser. No. 289,338, and Ser. No. 288,833, filed concurrently on Dec. 23, 1988, now U.S. Pat. Nos. 4,914,510 and 4,914,511, respectively, relate to CRTs with interference filters for projection television in which the luminance gradient and the number of filter layers respectively, are altered to improve white field uniformity of the projection image. Copending U.S. patent application Ser. No. 459,886, Attorney's Docket No. SEPHA 60,079, filed concurrently herewith, relates to such CRTs in which one of the filter layers is altered to improve luminance uniformity.

BACKGROUND OF THE INVENTION

This invention relates to color projection television (PTV) display devices using monochrome cathode ray tubes (CRTs), and more particularly relates to such devices using such tubes having a convexly curved inner surface of the display window.

Monochrome CRTs for color PTV each employ a single electron gun mounted in the neck of the tube to focus a single electron beam on the fluorescent display screen of the tube. A deflection yoke surrounding the neck of the tube, and associated electron circuitry, cause the beam to scan the screen as well as to vary in intensity in response to a video signal to produce a monochrome display image.

In color PTV, three such displays, each in one of the primary colors red, blue and green, are superimposed on a large projection screen to produce a full color display image. Because the images on the individual tube screens are not viewed directly, but are magnified and projected by a system of projection lenses, the individual cathode ray tubes are driven at higher loads than would be encountered for direct view tubes, in order to produce a full color display of acceptable brightness.

Projection tubes having an interference filter on the display window are described in U.S. Pat. No. 4,634,926, assigned to U.S. Philips Corporation. The filter, herein referred to as a shortwave pass (SWP) filter, is composed of alternating layers of materials of high and low refractive index. The filter is designed to result in a marked increase in luminous efficiently of the tube in the forward direction, as well as improved chromaticity and contrast. Even further improvements are provided, especially in light gain in the corners of the display screen, by combining such an interference filter with an inwardly or convexly curved display window, as provided in U.S. Pat. No. 4,683,398, also assigned to U.S. Philips Corporation.

In these tubes, the interference filter is deposited directly upon the curved inner surface of the display window, and the luminescent phosphor screen is deposited on the interference filter. The filter is typically composed of from 14 to 20 layers, each having a thickness of about one quarter of the central wavelength of the filter.

Such tubes with interference filters, while exhibiting a marked increase in luminous efficiency in the forwarded direction, as well as improved chromaticity and contrast, also exhibit greater luminance in the center than at the edges of the display, sometimes referred to herein as center-to-edge luminance gradient.

This center-to-edge luminance gradient, also referred to as the "bulls-eye effect", is due not only to the intentional design of the filter to concentrate the luminous output in the forward direction, but also to the unintentional decrease in thickness of the filter from the center toward the edges of the display window, due in large part to the shadowing effect of an upstanding peripheral sidewall or skirt, which extends rearward from the display window and joins the display window to the funnel-shaped portion of the CRT envelope.

Even in tubes without interference filters, a less noticeable bulls-eye effect is often present in the display due to a fall-off of light intensity toward the edges of the screen.

This bulls-eye effect is partially alleviated by the use of the convexly curved inner surface of the display window, which tends to direct most of the light into the projection lens. However, since the radius of curvature of this inner surface is not an exact match for that of the projection lens, the bulls-eye effect cannot be completely compensated by this technique.

OBJECTS AND SUMMARY OF THE INVENTION

It is a principal object of the invention to improve the luminance uniformity of a monochrome cathode ray tube having a display window with a convexly curved inner surface.

It is another object of the invention to improve the luminance uniformity of such a monochrome cathode ray tube carrying an interference filter.

It is another object of the invention to provide a color projection television display device incorporating one or more of such monochrome cathode ray tubes with improved luminance uniformity.

In accordance with the invention, the luminance uniformity of a monochrome cathode ray tube having a display window with a convexly curved inner surface is improved by providing means uniformly distributed in the display window for attenuating at least the wavelengths of radiation emitted by the CRT during operation. Due to the thickness distribution of the display window inherent in its convex shape, the display window will provide greater attenuation of the emitted radiation in the center and progressively less attenuation toward the edges of the display window, thus at least partially compensating for the bulls-eye effect.

In a preferred embodiment of the invention, the display window is of a uniform neutral density, defined herein as the ability to substantially attenuate all wavelengths of visible radiation by approximately the same amount.

In another preferred embodiment, the display window is uniformly tinted in a color corresponding to the color of emitted radiation of the tube during operation, for example, one of the primary colors red, green or blue.

Such neutral density or color tint is generally preferred to be such as to achieve a display window transmission within the range of 70–90% for the wavelengths of interest.

In a further preferred embodiment, the CRT carries an interference filter on the inner surface of the display window.

In accordance with another aspect of the invention, a multi-tube color projection television display device incorporates at least one such CRT with improved luminance uniformity.

DESCRIPTION OF THE PREFERRED EMBODIMENTS

Figure 1:
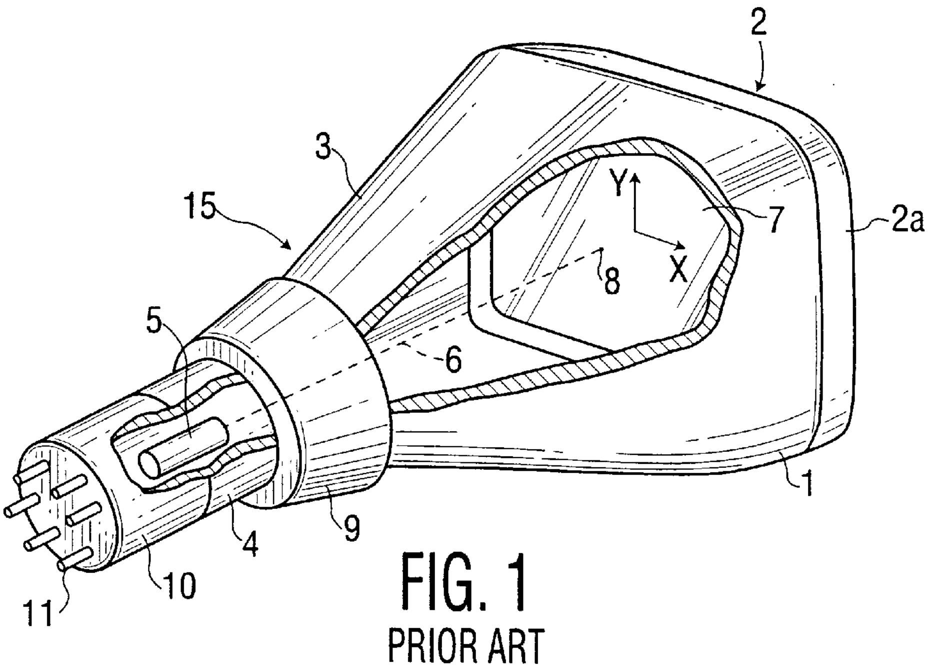
FIG. 1 PRIOR ART
FIG. 1 is a perspective view, partly broken away, of a projection television display tube of the prior art.

FIG. 1 is a perspective view, partly broken away, of a projection television display tube 15 according to the prior art. The tube comprises a glass envelope 1 which consists of a convexly curved display window 2, a funnel 3, and a neck 4, within which is mounted an electron gun 5 for generating an electron beam 6. The electron beam is focussed on curved display screen 7, on the inside of display window 2, to form a spot 8. The electron beam 6 is deflected over the display screen 7 in two mutually perpendicular directions along X and Y axes (sometimes referred to as the major and minor axes, respectively), by means of a system of deflection coils 9. Electrical connection to gun 5 is provided through base 10 with connection pins 11.

Figure 2A:
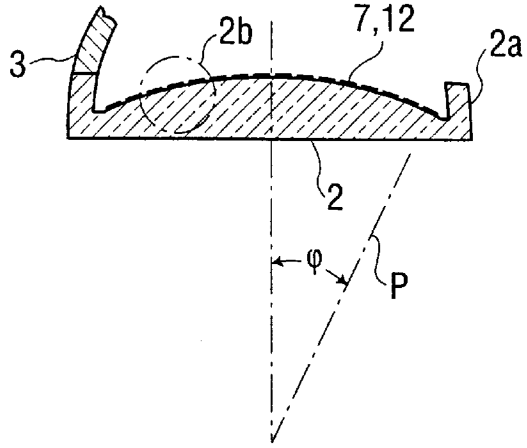
FIG. 2a PRIOR ART
FIG. 2*a* is a diagrammatic cross-section of a portion of the front of the display tube of FIG. 1, showing the display window bearing a luminescent screen and interference filter on its inner convexly curved surface.
Figure 2B:
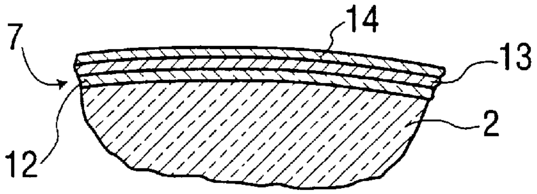
FIG. 2b PRIOR ART
FIG. 2*b* is a detailed cross-section of a portion of the window, screen and filter of FIG. 2*a;*

FIG. 2*a* is a partial sectional view of the curved display window 2, the display screen 7, and the multi-layer interference filter 12. The inner surface of the display window is preferably convexly curved to as near spherical as possible, but may also be of aspherical shape. As seen in more detail in FIG. 2*b*, the display screen 7 consists of a layer of luminescent material (phosphor) 13 and a thin aluminum film 14, overlying filter 12.

The details of the filter design are known from the teachings of U.S. Pat. Nos. 4,683,398 and 4,634,926, cited above, and are therefore not a necessary part of this description. Briefly however, the filter is a short wave pass (SWP) filter comprising alternating layers of low and high refractive index materials, such as $SiO_2$ and $TiO_2$, having refractive indices of 1.44 and 2.35, respectively. These layers are typically formed by vapor deposition directly on the inner surface of the display window until a total of from 14 to 20 layers have been deposited, increasing numbers of layers resulting in increased definition of the cut-off wavelength of the filter.

In addition to such a SWP filter, the interference filter may also be in the form of a bandpass (BP) filter in accordance with the teachings of copending patent application Ser. No. 217,259, filed Jul. 11, 1988, Attorney's Docket No. SEPHA 60067, assigned to North American Philips Corporation.

As already stated, the interference filters are designed to concentrate the luminous output of the CRT in a forward direction, in order to increase the luminance of the projection display, but also resulting in a luminance non-uniformity called the bulls-eye effect. This bulls-eye effect is worsened in the case of a display window with a skirt, due to the shadowing effect of the skirt during the deposition of the filter layers, causing the layers to become thinner toward the edges of the display window. While the convex curvature of the inner surface of the display window is designed to compensate for this bulls-eye effect, it is not completely effective, due in great part to the mismatch of its curvature with that of the projection lens.

According to the invention, further compensation for the bulls-eye effect in such tubes is realized by the simple expedient of using a uniformly darkened or tinted glass or other optical material for the display window. Since the display window is thicker in the center than at the edges, the attenuation of light output of the CRT due to the darkening or tinting of the display window is greatest at the center and gradually decreases toward the edges of the window.

Figure 3:
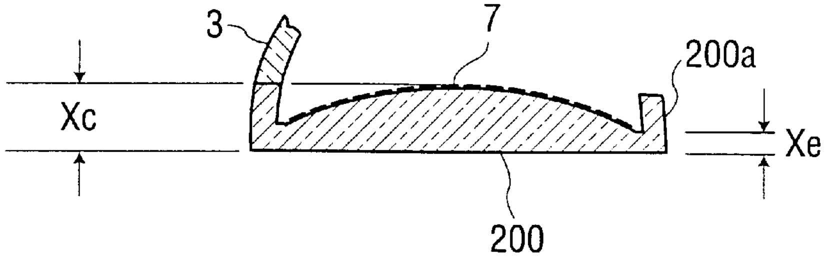
FIG. 3 is a cross-section similar to that of FIG. 2*a* for one embodiment of a display window of the invention having a uniformly distributed optical attenuation means.

FIG. 3 shows one embodiment of such a display window 200, having a skirt 200*a* and having a center thickness $X_c$ and an edge thickness $X_e$; for example, $X_c$=13 mm and $X_e$=7 mm. For such dimensions, the amount of correction of the center-to-edge luminance gradient can be calculated as follows:

$$T_c = T_1 e^{-\mu Xc} \quad (1)$$

and $$T_e = T_1 e^{-\mu Xc} \quad (2)$$

where $T_c$ is the transmission at the center of the display window,

Ti is the zero thickness transmission value of 0.96 for only one surface reflection, $T_e$ is the transmission at the edge of the window, $\mu$ is the linear absorption coefficient of the window material, and X is the thickness of the window.

The ratio of the transmissions at center and edge then becomes:

$$Te/Tc = e^{-\mu(Xe-Xc)} \quad (3)$$

For $\mu$=0.005, $T_e/T_c$=1.03, which is equivalent to about a 3.0% correction in the bulls-eye effect from center to edge. For the same thickness values, ($X_c$=13 mm, $X_e$=7 mm), Table 1 presents similar correction values for a range of $\mu$ values which yield a 0 to 37% improvement in Edge to Center Transmission.

TABLE I

EDGE TO CENTER TRANSMISSION FOR CURVED PTV PANEL GLASS

| CENTER TRANS Tc | MU u | EDGE TRANS Te | RATIO Te/Tc | IMPROVEMENT % |
|---|---|---|---|---|
| 0.45 | 0.058283 | 0.638389 | 1.418644 | 37.70099 |
| 0.5 | 0.050178 | 0.675654 | 1.351308 | 31.16507 |
| 0.55 | 0.042847 | 0.711234 | 1.293153 | 25.52027 |
| 0.6 | 0.036154 | 0.745350 | 1.242250 | 20.57936 |
| 0.65 | 0.029996 | 0.778177 | 1.197196 | 16.20609 |
| 0.7 | 0.024296 | 0.809857 | 1.156939 | 12.29862 |
| 0.75 | 0..018989 | 0.840509 | 1.120679 | 8.779042 |
| 0.8 | 0.014024 | 0.870232 | 1.087790 | 5.586619 |
| 0.85 | 0.009361 | 0.899108 | 1.057775 | 2.673189 |
| 0.9 | 0.004964 | 0.927211 | 1.030235 | 0 |

As can be seen from the Table, high $\mu$ values give greater degrees of correction, but of course, also cause a correspondingly greater reduction in brightness.

Glasses with reduced transmissions suitable for use in this invention are known, and some are presently being used in color CRTs for conventional direct-view television to increase the contrast of the direct-view display.

Various glass constituents are known which when added to a glass composition result in a darkening or in a color tint, the effect dependent upon the particular constituent added, its concentration, and sometimes upon the conditions under which the glass is processed, for example, atmosphere (oxidizing or reducing), temperature and time. The degree of linear absorption which results is generally dependent upon the amount of the constituent added.

Figure 4:
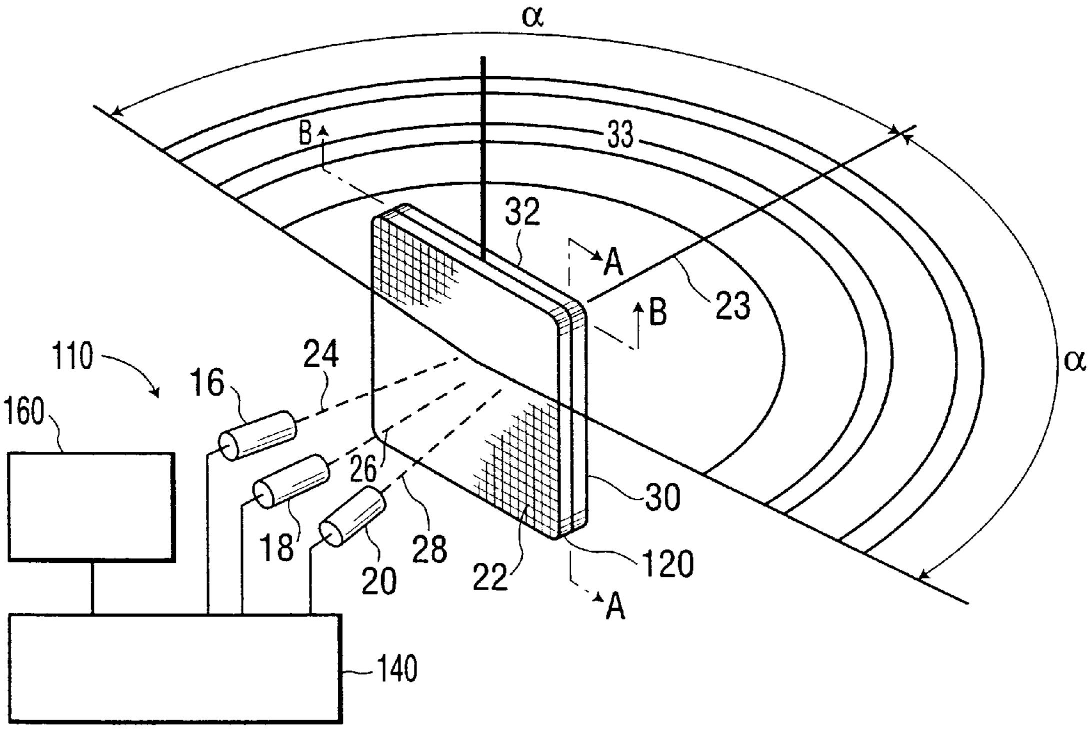
FIG. 4 is a diagrammatic representation of a three-tube color projection television incorporating at least one display tube of the invention.

A conventional three-tube color projection television device is shown diagrammatically in FIG. 4, employing a rear projection screen. Video signals are received by television receiver circuits 140 and are projected through individual red, green and blue cathode ray tube (CRT)/lens projector assemblies 16, 18 and 20, onto the rear surface 22 of projection screen 120. The three CRT/lens projector assemblies 16, 18 and 20 each include a CRT and associated projection optics, and are arranged horizontally with respect to screen 120. The green assembly 18 is located so as to have its optical axis 26 coincide with the central projection axis, while the red and blue assemblies 16 and 20 having optical axis 24 and 28 respectively, are laterally and angularly offset from the green axis 26.

In accordance with the invention, one or more of the CRTs has a darkened or tinted display window for reduced bulls-eye effect on the projection screen image. While correction of less than all of the tubes can have an adverse effect upon the white field uniformity of the projection image, it is recognized that other techniques for reducing the bulls-eye effect can be used in combination with the present invention, for example, as described in my copending U.S. patent application Ser. No. 459,886, or U.S. Pat. No. 4,914,510, assigned to North American Philips Corporation.

What is claimed is:

1. A monochrome cathode ray tube for projection television comprising in an evacuated envelope a display screen on a convexly curved inner surface of a display window in the wall of the envelope, the display screen comprising a layer of a luminescent material, characterized in that means for attenuating at least the wavelengths of radiation corresponding to the luminescent output of the tube are uniformly distributed in the display window so as to attenuate all wave lengths of said radiation by about the same amount, said amount being such as to result in a transmission of the display window in the range of about 70 to 90 percent thereby to improve the luminance uniformity of the display.

2. The tube of claim 1, in which a multi-layer interference filter is located between the luminescent material layer and the display window.

3. The tube of claim 1, in which the attenuation takes place over a range of wavelengths including the red, blue and green portions of the visible spectrum.

4. A three tube color projection television display device having red, blue and green emitting monochrome cathode ray display tubes, the tubes each comprising in an evacuated envelope a display screen on the inner surface of a display window in the wall of the envelope, said display screen comprising a layer of a luminescent material, and at least one of the tubes also having a convexly curved inner display window surface, characterized in that the at least one of the tubes includes means uniformly distributed in the display window for attenuating all the wavelengths of radiation corresponding to the luminescent output of the tube by about the same amount, said amount being such as to result in a transmission of the display window within the range of about 70 to 90 percent, thereby to improve the luminance uniformity of the display.

5. The display device of claim 4 in which an interference filter is located between the luminescent material layer and the display window.

6. The display device of claim 4 in which all three of the tubes have a convexly curved inner display window surface, and the attenuating means are included in all three tubes.

7. The display device of claim 6 in which an interference filter is located between the luminescent material layer and the display window.

8. A cathode ray tube of claim 1 in which the display window is glass.

* * * * *